(12) United States Patent
Nagai

(10) Patent No.: US 7,631,090 B2
(45) Date of Patent: Dec. 8, 2009

(54) NETWORK DEVICE WITH ADDRESSING FILTERING

(75) Inventor: Yusuke Nagai, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 938 days.

(21) Appl. No.: 10/921,898

(22) Filed: Aug. 20, 2004

(65) Prior Publication Data

US 2005/0060407 A1  Mar. 17, 2005

(30) Foreign Application Priority Data

Aug. 27, 2003  (JP) .............................. 2003-303624

(51) Int. Cl.
*G06F 15/16* (2006.01)
*G06F 15/173* (2006.01)

(52) U.S. Cl. ........................ 709/229; 709/206; 709/225

(58) Field of Classification Search ................. 709/206, 709/225, 229
See application file for complete search history.

(56) References Cited

U.S. PATENT DOCUMENTS

| | | | | | |
|---|---|---|---|---|---|
| 5,805,801 | A | * | 9/1998 | Holloway et al. .............. | 726/22 |
| 6,044,402 | A | * | 3/2000 | Jacobson et al. ............. | 709/225 |
| 6,092,110 | A | * | 7/2000 | Maria et al. .................. | 709/225 |
| 6,230,187 | B1 | * | 5/2001 | Suzuki ......................... | 709/206 |
| 6,609,128 | B1 | * | 8/2003 | Underwood .................. | 707/10 |
| 6,721,059 | B1 | * | 4/2004 | Sturgeon et al. ............. | 358/1.15 |
| 6,826,698 | B1 | * | 11/2004 | Minkin et al. .................. | 726/1 |
| 7,069,444 | B2 | * | 6/2006 | Lowensohn et al. ......... | 713/185 |
| 2001/0014911 | A1 | * | 8/2001 | Doi et al. ..................... | 709/221 |
| 2002/0026503 | A1 | * | 2/2002 | Bendinelli et al. ........... | 709/220 |
| 2002/0029276 | A1 | * | 3/2002 | Bendinelli et al. ........... | 709/227 |
| 2002/0165960 | A1 | * | 11/2002 | Chan ........................... | 709/225 |
| 2003/0154381 | A1 | * | 8/2003 | Ouye et al. .................. | 713/182 |
| 2003/0236847 | A1 | * | 12/2003 | Benowitz et al. ............. | 709/206 |
| 2004/0030768 | A1 | * | 2/2004 | Krishnamoorthy et al. .. | 709/223 |
| 2004/0093382 | A1 | * | 5/2004 | Kulkarni ...................... | 709/206 |
| 2004/0103205 | A1 | * | 5/2004 | Larson et al. ................ | 709/229 |
| 2004/0111480 | A1 | * | 6/2004 | Yue ............................. | 709/206 |
| 2004/0167881 | A1 | * | 8/2004 | Masuda ......................... | 707/3 |
| 2004/0210639 | A1 | * | 10/2004 | Ben-Yoseph et al. ........ | 709/206 |
| 2005/0044160 | A1 | * | 2/2005 | McElligott .................... | 709/207 |
| 2005/0169274 | A1 | * | 8/2005 | Shuster ........................ | 370/392 |
| 2006/0195897 | A1 | * | 8/2006 | Yajima et al. ................. | 726/11 |
| 2007/0050777 | A1 | * | 3/2007 | Hutchinson et al. ......... | 718/104 |

FOREIGN PATENT DOCUMENTS

JP   10-143338 A   5/1998

* cited by examiner

*Primary Examiner*—Salad Abdullahi
*Assistant Examiner*—Imad Hussain
(74) *Attorney, Agent, or Firm*—Birch, Stewart, Kolasch & Birch, LLP

(57) ABSTRACT

When it is judged that the IP address of a PC for the administrator is not included in IP addresses received from the PC for the administrator under accessing while a PC whose access is to be authorized is registered (NO in S20), the IP address of the PC for the administrator is registered besides IP addresses received for identifying PCs (S21). Meanwhile, when it is judged that the IP address of a PC for the administrator is included in IP addresses received from the PC for the administrator under accessing while a PC whose access is to be rejected is registered (YES in S43), the IP addresses received for identifying PCs are registered after excluding the IP address of the PC for the administrator therefrom (S21). This makes it possible to avoid a situation that an access from the terminal device for the administrator to a network device becomes impossible.

14 Claims, 13 Drawing Sheets

FIG. 3

| SETTING | CONNECTION REJECTION |
|---|---|
| 1 | 192.168.10.1 |
| 2 | 192.168.10.2 |
| 3 | 192.168.10.3 |
| 4 | 192.168.10.4 |
| 5 | |
| 6 | |
| 7 | |

◇ Add. Filter Setting

Filter: Effective ▽

Filter Mode : Rejection ▽

<IP Address Filter>

| Name | IP Add. |
|---|---|
| Filter Add. 1 | 192.168.10.1 |
| Filter Add. 2 | 192.168.10.2 |
| Filter Add. 3 | 192.168.10.3 |
| Filter Add. 4 | 192.168.10.4 |
| Filter Add. 5 | 192.168.10.5 |
| Filter Add. 6 | |
| Filter Add. 7 | |

<Mac Address Filter>

| Name | Mac Add. |
|---|---|
| Filter Add. 1 | |
| Filter Add. 2 | |
| Filter Add. 3 | |
| Filter Add. 4 | |
| Filter Add. 5 | |
| Filter Add. 6 | |
| Filter Add. 7 | |

Register

NETWORK DEVICE WITH ADDRESSING FILTERING

CROSS-REFERENCE TO RELATED APPLICATIONS

This Nonprovisional application claims priority under 35 U.S.C. §119(a) on Patent Application No. 2003-303624 filed in Japan on Aug. 27, 2003, the entire contents of which are hereby incorporated by reference.

BACKGROUND OF THE INVENTION

1. Field of the Invention

The present invention relates to a network device, such as a print server, a facsimile server or an MFP (Multiple Function Printer) having these functions in complex with each other, which is network-connected with a plurality of terminal devices and can function as a server that can be accessed by these terminal devices.

2. Description of Related Art

Prepared in a network system, in which various devices (network devices) that can function as servers are connected with a plurality of terminal devices through a network, is a function (network filtering function) which makes it possible to set a terminal device an access from which is not authorized (rejected) or a terminal device an access from which is authorized, for the purpose of ensuring security or the like.

Disclosed in Japanese Patent Application Laid-Open No. H10-143338 (1998), for example, is a network printer serving as a network device which performs network filtering using an IP address as identification information for identifying a terminal device, so that a print (access) can be made only through a terminal device that is preliminarily registered.

With the invention disclosed in Japanese Patent Application Laid-Open No. H10-143338 (1998), the network filtering can be set through a terminal device which is directly connected by a serial interface; meanwhile, the network filtering in a recent network device can be set through a specific terminal device, for example a terminal device for the administrator, via a network using a dedicated application or browser.

In such a network system, however, a plurality of terminal devices are connected to the network while one or precious few terminal devices for the administrator are provided therein. Moreover, identification information, such as an IP address, for specifying each terminal device is given even to a terminal device for the administrator as well as other terminal devices. Such identification information of a terminal device for the administrator is not especially different from that of other terminal devices, and is merely different in some numbers, signs or the like.

Consequently, in a case where access rejection against a network device is set through a terminal device for the administrator, for example, there is a fear that, when an address of a terminal device for the administrator has been inputted by mistake, the administrator using the terminal device for the administrator completes setting without noticing the fact. When such setting is performed, any access to the network device cannot be made even from the terminal device for the administrator and the terminal device for the administrator cannot set access authorization of its own for the network device.

When such a situation occurs, there arises a need for hardware reset of the network device in the worst case, and accordingly, there arises a need for the whole reset of the network device since various settings other than the setting of the network filtering are reset and erased.

BRIEF SUMMARY OF THE INVENTION

The present invention has been made with the aim of solving the above problems, and it is an object thereof to provide a network device which can avoid a situation that an access from a terminal device for the administrator to the network device becomes impossible due to a setting mistake, by checking whether a terminal device itself used for setting, in particular a terminal device for the administrator for example, is an object of setting or not, and alarming according to need or realizing a suitable setting state automatically.

The first aspect of the network device according to the present invention is a network device, which is network-connected with a plurality of terminal devices and has a network filtering function for rejecting an access from a preliminarily registered terminal device among the plurality of terminal devices, characterized by comprising: an identification information registration unit on which identification information for identifying a terminal device an access from which is to be rejected is registered; detecting means for detecting identification information of a terminal device under accessing; judging means for judging whether the identification information detected by the detecting means is included in received identification information or not, when identification information of a terminal device an access from which is to be rejected is received from the terminal device under accessing; and registering means for, when the judging means judges that the identification information detected by the detecting means is included in the received identification information, registering the received identification information on the identification information registration unit after excluding the identification information detected by the detecting means from the received identification information.

Regarding the first aspect of the network device according to the present invention, when it is judged that the detected identification information, i.e. the identification information of a terminal device under accessing, in particular a terminal device for the administrator, is included in the received identification information, the identification information received as identification information for identifying a terminal device an access from which is to be rejected is registered on the identification information registration unit after excluding the detected identification information, in particular the identification information for the terminal device for the administrator, from the received identification information.

The second aspect of the network device according to the present invention is a network device, which is network-connected with a plurality of terminal devices and has a network filtering function for authorizing an access from a preliminarily registered terminal device among the plurality of terminal devices, characterized by comprising: an identification information registration unit on which identification information for identifying a terminal device an access from which is to be authorized is registered; detecting means for detecting identification information of a terminal device under accessing; judging means for judging whether the identification information detected by the detecting means is included in received identification information or not, when identification information of a terminal device an access from which is to be authorized is received from the terminal device under accessing; and registering means for, when the judging means judges that the identification information detected by the detecting means is not included in the received identification, registering the received identification information on the identification information registration unit after adding the identification information detected by the detecting means to the received identification information.

Regarding the second aspect of the network device according to the present invention, when it is judged that the detected identification information, i.e. the identification information of a terminal device under accessing, in particular a terminal device for the administrator, is included in the received identification information, the identification information received as identification information for identifying a terminal device an access from which is to be authorized is registered on the identification information registration unit after adding the detected identification information, in particular the identification information of the terminal device for the administrator, to the received identification information.

The third aspect of the network device according to the present invention is a network device, which is network-connected with a plurality of terminal devices and has a network filtering function for rejecting an access from a preliminarily registered terminal device among the plurality of terminal devices, characterized by comprising: an identification information registration unit on which identification information for identifying a terminal device an access from which is to be rejected is registered; detecting means for detecting identification information of a terminal device under accessing; judging means for judging whether the identification information detected by the detecting means is included in received identification information or not, when identification information of a terminal device an access from which is to be rejected is received from the terminal device under accessing; and means for, when the judging means judges that the identification information detected by the detecting means is included in the received identification information, notifying the terminal device under accessing of the same.

Regarding the third aspect of the network device according to the present invention, when it is judged that the detected identification information, i.e. the identification information of a terminal device under accessing, in particular a terminal device for the administrator, is included in the received identification information, the fact that the identification information of the terminal device is set as identification information of a terminal device an access from which is to be rejected is notified to the terminal device to which the detected identification information is given, in particular the terminal device for the administrator.

The fourth aspect of the network device according to the present invention is a network device, which is network-connected with a plurality of terminal devices and has a network filtering function for authorizing an access from a preliminarily registered terminal device among the plurality of terminal devices, characterized by comprising: an identification information registration unit on which identification information for identifying a terminal device an access from which is to be authorized is registered; detecting means for detecting identification information of a terminal device under accessing; judging means for judging whether the identification information detected by the detecting means is included in received identification information or not, when identification information of a terminal device an access from which is to be authorized is received from the terminal device under accessing; and means for, when the judging means judges that the identification information detected by the detecting means is not included in the received identification information, notifying the terminal device under accessing of the same.

Regarding the fourth aspect of the network device according to the present invention, when it is judged that the detected identification information, i.e. the identification information of a terminal device under accessing, in particular a terminal device for the administrator, is included in the received identification information, the fact that the identification information of the terminal device is not set as identification information of a terminal device an access from which is to be authorized is notified to the terminal device to which the detected identification information is given, in particular the terminal device for the administrator.

The fifth aspect of the network device according to the present invention is a network device, which is network-connected with a plurality of terminal devices and has a network filtering function for rejecting an access from a preliminarily registered terminal device among the plurality of terminal devices, characterized by comprising: an identification information registration unit on which identification information for identifying a terminal device an access from which is to be rejected is registered; detecting means for detecting identification information of a terminal device under accessing; judging means for judging whether the identification information detected by the detecting means is included in received identification information or not, when identification information of a terminal device an access from which is to be rejected is received from the terminal device under accessing; and means for, when the judging means judges that the identification information detected by the detecting means is included in the received identification information, making a display state of the identification information detected by the detecting means on a display screen of the terminal device under accessing different from other identification information.

Regarding the fifth aspect of the network device according to the present invention, when it is judged that the detected identification information, i.e. the identification information of a terminal device under accessing, in particular a terminal device for the administrator, is included in the received identification information, the display state of the identification information of the terminal device on the display screen of the terminal device to which the detected identification information is given, in particular the terminal device for the administrator, is made different from other identification information.

The sixth aspect of the network device according to the present invention is a network device, which is network-connected with a plurality of terminal devices and has a network filtering function for authorizing an access from a preliminarily registered terminal device among the plurality of terminal devices, characterized by comprising: an identification information registration unit on which identification information for identifying a terminal device an access from which is to be authorized is registered; detecting means for detecting identification information of a terminal device under accessing; judging means for judging whether the identification information detected by the detecting means is included in received identification information or not, when identification information of a terminal device an access from which is to be authorized is received from the terminal device under accessing; and means for, when the judging means judges that the identification information detected by the detecting means is not included in the received identification information, setting the identification information detected by the detecting means on a display screen of the terminal device under accessing as identification information to be registered.

Regarding the sixth aspect of the network device according to the present invention, when it is judged that the detected identification information, i.e. the identification information of a terminal device under accessing, in particular a terminal device for the administrator, is included in the received identification information, the identification information of the terminal device is automatically set as identification information to be registered, on the display screen of the terminal device to which the detected identification information is given, in particular the terminal device for the administrator.

The above and further objects and features of the invention will more fully be apparent from the following detailed description with accompanying drawings.

BRIEF DESCRIPTION OF THE SEVERAL VIEWS OF THE DRAWINGS

FIG. 3 is a schematic view showing an example of the content registered on an address restriction managing unit;

FIG. 7 is a schematic view showing a display screen to be displayed on a display apparatus of a terminal device (PC) for the administrator;

DETAILED DESCRIPTION OF THE PREFERRED EMBODIMENTS

The following description will explain the present invention in detail on the basis of the most preferable embodiment.

Figure 1:
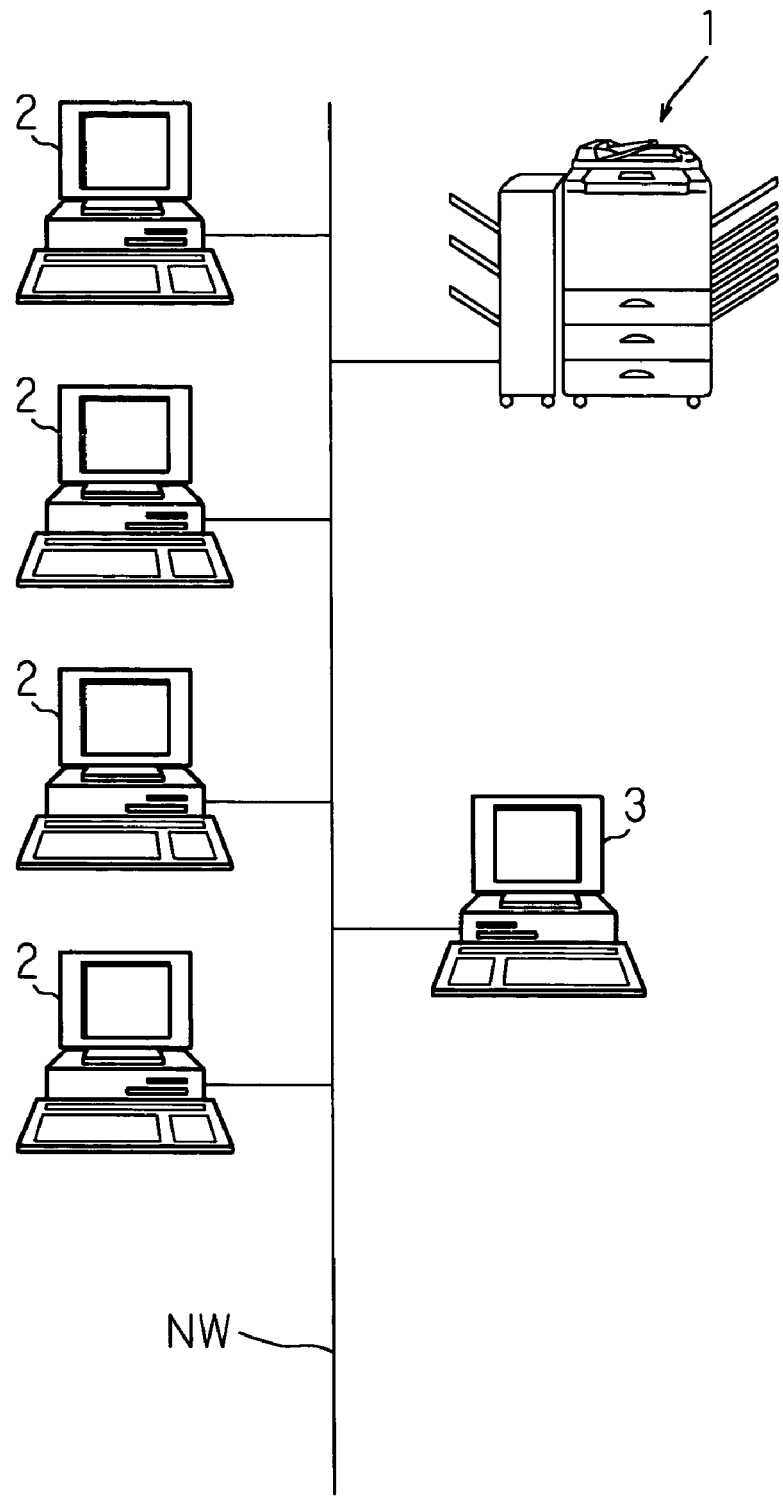
FIG. 1 is a schematic view showing the network configuration centered on an MFP serving as a network device according to the present invention.

FIG. 1 is a schematic view showing the network configuration centered on an MFP 1 serving as a network device according to the present invention. Personal computers (hereinafter referred to as "PCs") 2 serving as general terminal devices (without administrator authority) and a PC 3 for the administrator (with administrator authority) are network-connected with the MFP 1 using a line such as the LAN as the network line. WWW browser software, which is not shown in the figure, is preliminarily installed in each of the PCs 2 and 3. WWW server software is preliminarily installed in the MFP 1 as described later. Consequently, the MFP 1 functions as a WWW server against each of the PCs 2 and 3, while each of the PCs 2 and 3 functions as a WWW client against the MFP 1.

It should be noted that an IP address, for example, is uniquely given to each device network-connected in FIG. 1, i.e. each of the MFP 1, PCs 2 and PC 3 for the administrator, as identification information for identifying each device. Here, when the network system shown in FIG. 1 is not connected to an external Internet or the like, a MAC address may be used instead of an IP address, or any other original identification information may be used.

Consequently, the network system shown in FIG. 1, which is configured centering on the MFP 1 serving as a network device, is managed by the PC 3 for the administrator on the basis of the IP address (or MAC address, other original identification information or the like).

Figure 2:
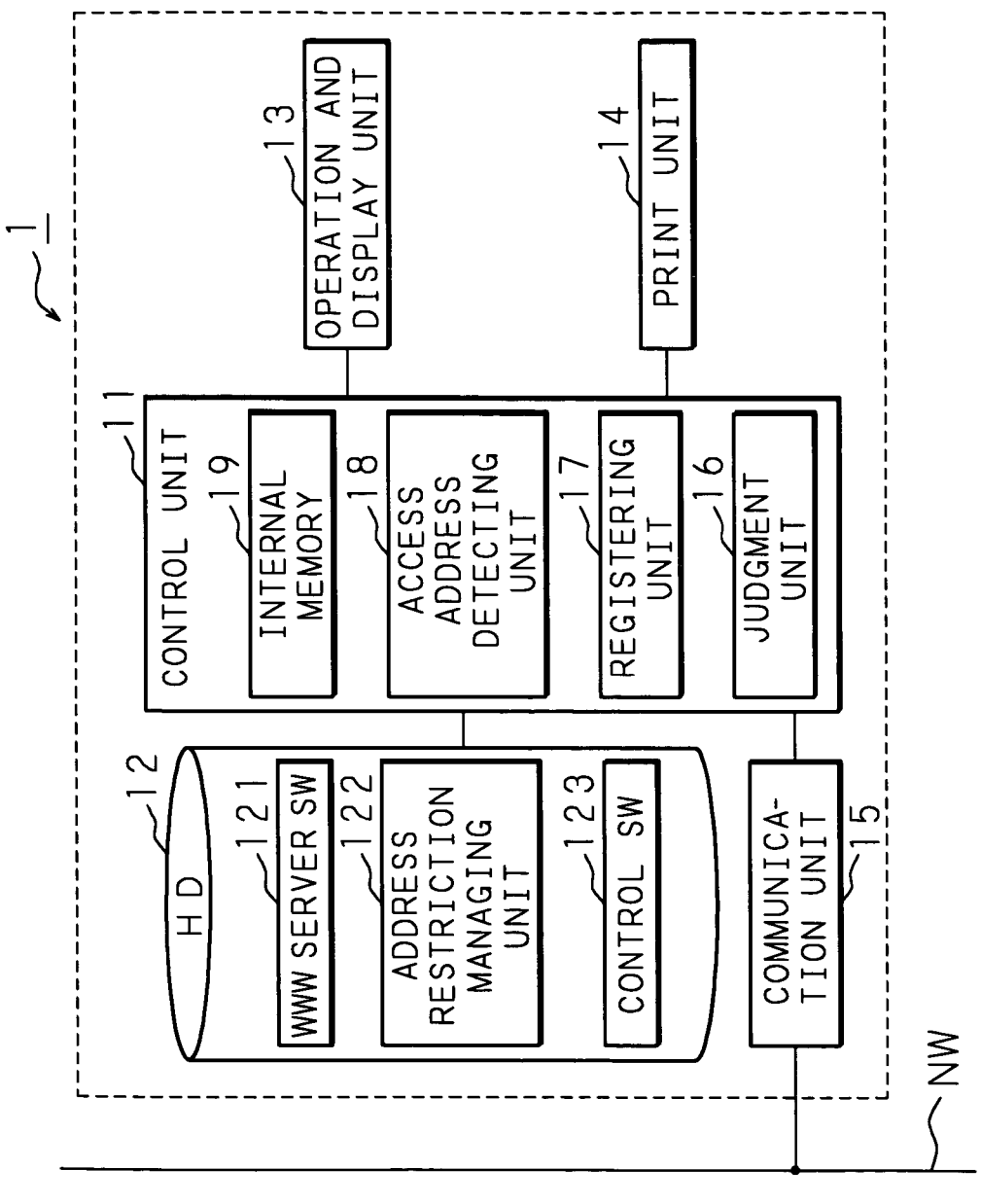
FIG. 2 is a block diagram showing an example of the internal configuration of the MFP serving as a network device according to the present invention.

FIG. 2 is a block diagram showing an example of the internal configuration of the MFP 1 serving as a network device according to the present invention. The MFP 1 is a device which has functions of a copying machine, a printer, a facsimile machine and the like in complex with each other. The MFP 1 can function as a server against the other PCs 2 and 3, and the aforementioned various functions of the MFP 1 can be utilized as a print serer, a facsimile server, a copy server and the like by individually accessing each of the PCs 2 and 3. Though it is needless to say various settings for the function of the MFP 1 can be performed by operating an operation panel attached to the MFP 1 itself, it is also possible to perform the setting through the PC 3 for the administrator.

The MFP 1 is composed of: a control unit 11 configured as a CPU, an MPU or the like; a hard disk 12; an operation and display unit 13; a print unit 14; a communication unit 15 and the like. It should be noted that a judgment unit 16, a registering unit 17, an access address detecting unit 18 and the like schematically represent the software function of the control unit 11 and an internal memory 19 is a working area used by the control unit 11.

In the hard disk 12, it is needless to say control software (SW) 123 for realizing a general function necessary for a MFP is stored, and besides, WWW server software (SW) 121 is preliminarily installed. Moreover, an address restriction managing unit 122 (identification information registration unit) in the form of a table is allocated at a suitable region of the hard disk 12. Though a detailed explanation will be described later, the IP addresses given to the respective PCs 2 and 3 are registered on the address restriction managing unit 122 according to need, in particular as an IP address of a PC an access from which to the MFP 1 is to be authorized or an IP address of a PC an access from which to the MFP 1 is to be rejected.

The operation and display unit 13 is composed of an operation panel provided with various keys, switches and the like for operating the MFP 1; a display apparatus such as an LCD; and the like. It should be understood that, though the operation and display unit 13 is provided in order to operate an original function of the MFP 1, various settings for the MFP 1 to be performed by the PC 3 for the administrator as described later can be performed directly through the operation and display unit 13.

The print unit 14 is electrophotographic printing means, for example, and makes a print on paper when the MFP 1 functions as a copying machine, as a printer, as a facsimile machine or the like. The communication unit 15 is connected to a network line NW such as the LAN and can make data communications with the PCs 2 and 3 connected to the network line NW.

The judgment unit 16, the registering unit 17, the access address detecting unit 18 and the like schematically represent the software function of the control unit 11, in particular the function of the control unit 11 by control software 123 preliminarily stored in the hard disk 12, and performs processes shown in a flow chart which will be described later.

It should be noted that WWW server software 121 installed in the MFP 1 displays various screens, which will be described later, on display screens of the respective PCs 2 and 3 when accessed from the respective PCs 2 and 3.

FIG. 3 is a schematic view showing an example of the content registered on the address restriction managing unit 122. In the example shown in FIG. 3, "CONNECTION REJECTION" is registered as "SETTING" and four IP addresses are registered. These IP addresses are IP addresses serving as identification information for respectively identifying four PCs of the PCs 2. Consequently, this means that accesses (connection) from the PCs, to which these four IP addresses registered on the address restriction managing unit 122 are given, to the MFP 1 are to be rejected. It should be noted that, when "CONNECTION AUTHORIZATION" is registered as "SETTING", accesses only from PCs, to which registered IP addresses are given, to the MFP 1 are authorized.

Figure 4:
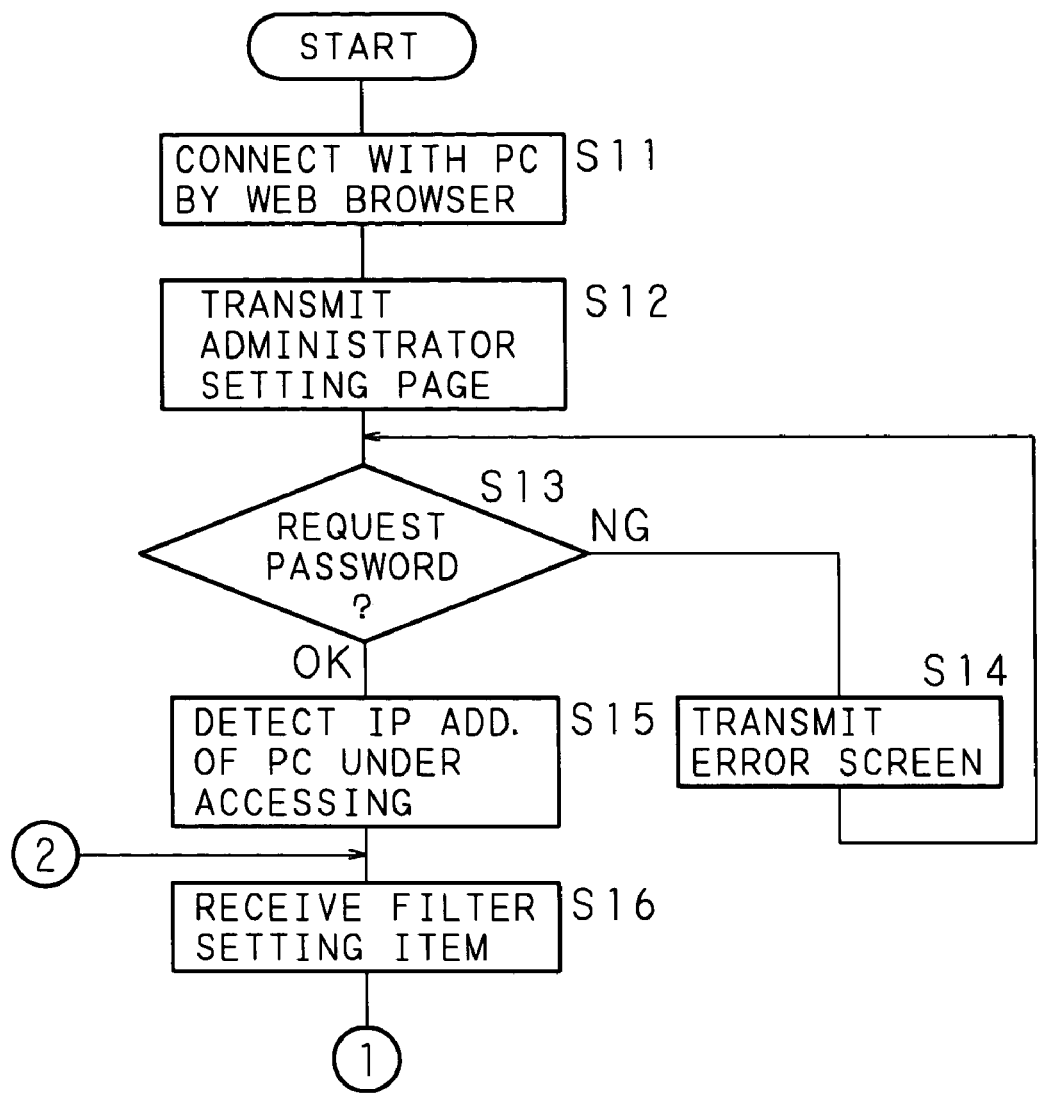
FIG. 4 is a flow chart showing the process procedure of a control unit of the MFP serving as a network device according to the present invention.
Figure 5:
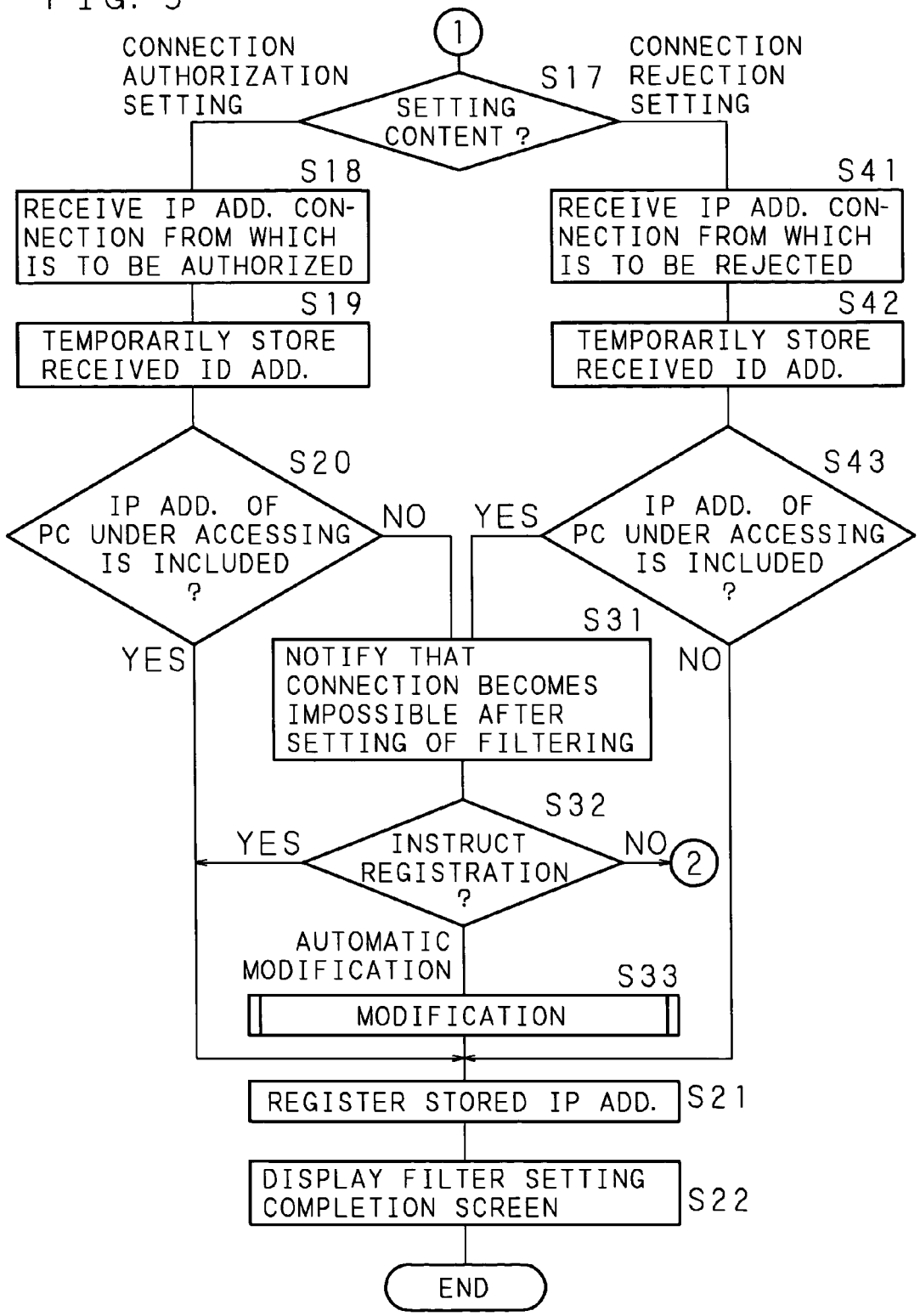
FIG. 5 is a flow chart showing the process procedure of the control unit of the MFP serving as a network device according to the present invention.
Figure 6:
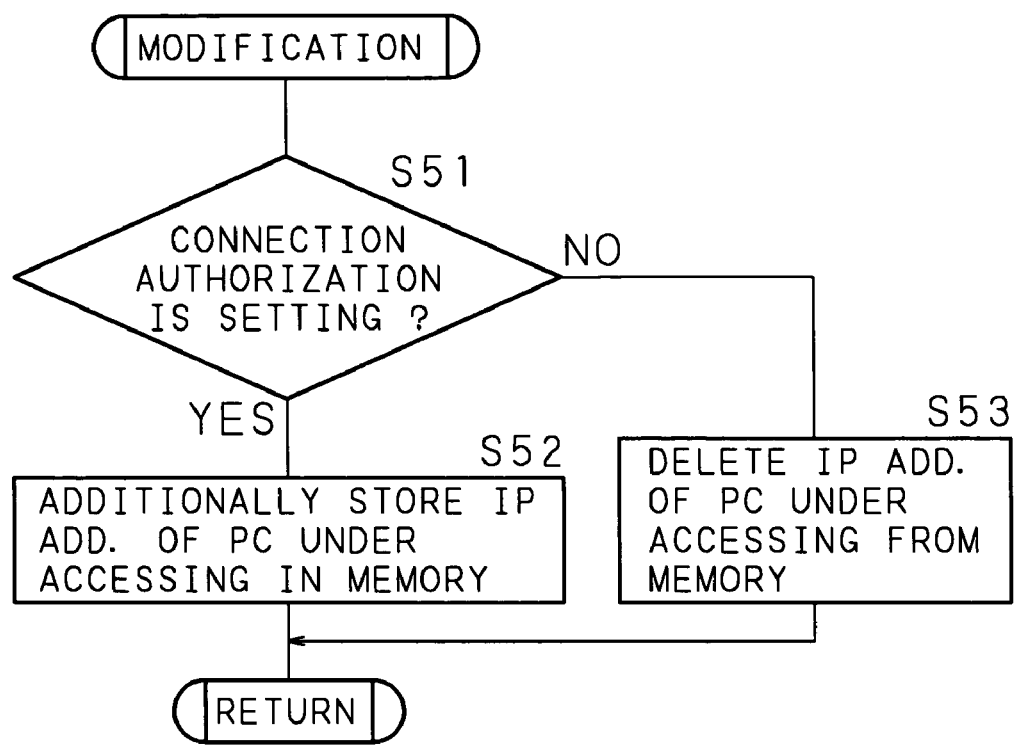
FIG. 6 is a flow chart showing the process procedure of the control unit of the MFP serving as a network device according to the present invention.

Next, the operation of the MFP 1 serving as a network device according to the present invention, which is configured as described above, is explained with reference to the flow charts of FIG. 4, FIG. 5 and FIG. 6 showing the process procedure of the control unit 11 and schematic views shown in FIG. 7 through FIG. 13 showing a display screen to be displayed on a display apparatus of the PC 3 for the administrator.

It should be noted that, in the following explanation, the WWW server software 121 is running in the MFP 1, the WWW browser software is running in the respective PCs 2 and 3, and transmit-receive of various data and communications between the MFP 1 and the respective PCs 2 and 3 are performed in the form of HTML documents. Moreover, various settings for the MFP 1 cannot be performed from the PCs 2, and can be performed only from the PC 3 for the administrator.

First, when an access is made from any one of PCs 2 and 3 and connection by a WEB browser is made (step S11), the control unit 11 transmits an administrator setting page to the PC under accessing through the communication unit 15 (step S12) and makes the PC to display the page. The control unit 11 then requests a password from the PC under accessing (step S13). When a password which is not a password for an access of the PC 3 for the administrator to the MFP 1, or an incorrect password, is received, or no data is received within a predetermined time period as a result (NG in step S13), for example, the control unit 11 transmits an error screen to the PC under accessing (step S14) and makes the PC display the screen.

When a password for an access of the PC 3 for the administrator to the MFP 1 is received from the PC under accessing in a predetermined time period (OK in step S13), it is confirmed that the PC under accessing is the PC 3 for the administrator, and the access address detecting unit 18 detects an IP address (step S15) and receives a filter setting item from the PC under accessing, i.e. the PC 3 for the administrator, through the communication unit 15 (step S16).

FIG. 7 is a schematic view showing an example of a screen to be displayed on a display apparatus of the PC 3 for the administrator in the step S16. In this example, "Filter" is set to "Effective" and "Rejection" is set as "Filter Mode" which is the filter setting item. In this case, registration on the address restriction managing unit 122 of the MFP 1 is performed so that an access from the IP address set (inputted) in the column of "IP Address Filter" shown on the screen to the MFP 1 is rejected. It should be noted that there is "Authorization" besides aforementioned "Rejection" in "Filter Mode", and the detailed explanation thereof will be described later.

Moreover, the column of "MAC Address Filter", which is shown in FIG. 7, is used for setting a MAC address.

As described above, there are "Authorization (connection authorization setting)" and "Rejection (connection rejection setting)" in the filter setting item. "Connection authorization setting" is a setting item for setting, in the MFP 1 from the PC 3 for the administrator, to which PC of the plurality of PCs 2 an access (connection) to the MFP 1 is to be authorized. On the other hand, "connection rejection setting" is a setting item for setting, in the MFP 1 from the PC 3 for the administrator, an access (connection) from which PC of the plurality of PCs 2 to the MFP 1 is to be rejected. In this case, IP addresses set (inputted) in the column of "IP Address Filter" shown in the schematic view of a screen in FIG. 7 are registered on the address restriction managing unit 122 of the MFP 1 so that an access from these IP addresses to the MFP 1 is rejected.

The following description will explain first about a case where "connection authorization setting" ("CONNECTION AUTHORIZATION SETTING" in step S17) is selected in the PC 3 for the administrator. In this case, "Filter" is kept "Effective" on the screen of the display apparatus of the PC 3 for the administrator shown in FIG. 7, and setting of "Filter Mode" is changed to "Authorization" by clicking a mouse, for example.

The IP address of the PC connection from which to the MFP 1 is to be authorized is then inputted in the column of "IP Address Filter" in the PC 3 for the administrator. When a "Register" button at the lower portion of the screen is clicked with the mouse, for example, the MFP 1 receives the IP address inputted in the column of "IP Address Filter" through the communication unit 15 (step S18), the setting of the address restriction managing unit 122 is changed to "CONNECTION AUTHORIZATION" and the received IP address is temporarily stored in the internal memory 19 (step S19).

The judgment unit 16 of the control unit 11 then judges whether the IP address of the PC 3 for the administrator which has been detected by the access address detecting unit 18 in the step S15 is included in the IP addresses which have been temporarily stored in the internal memory 19 in step S19 or not (step S20). When it is judged that the IP address of the PC 3 for the administrator is included in the IP addresses stored in the internal memory 19 as a result (YES in step S20), the registering unit 17 of the control unit 11 registers in the address restriction managing unit 122 the IP addresses which have been temporarily stored in the internal memory 19 in the step S19 without changing the IP addresses (step S21), transmits a filter setting completion screen which is not illustrated in the figure to the PC 3 for the administrator through the communication unit 15 and makes the PC 3 for the administrator display the screen (step S22).

Thus, an access from the PC 3 for the administrator to the MFP 1 is possible even after setting of filtering.

On the other hand, in a case of "NO" in the step S20, i.e. when it is judged that the IP address of the PC 3 for the administrator which has been detected by the access address detecting unit 18 is not included in the IP addresses which have temporarily stored in the internal memory 19, the control unit 11 notifies the PC 3 for the administrator through the communication unit 15 that connection (access) from the PC 3 for the administrator becomes impossible after setting of filtering (step S31). In this case, displayed on the PC 3 for the administrator are, for example, three kinds of buttons including "Register", "Modify & Register" and "Redo", and message "The address of the user making setting is included in the IP addresses for connection rejection. Is registration to be continued?".

Figure 8:
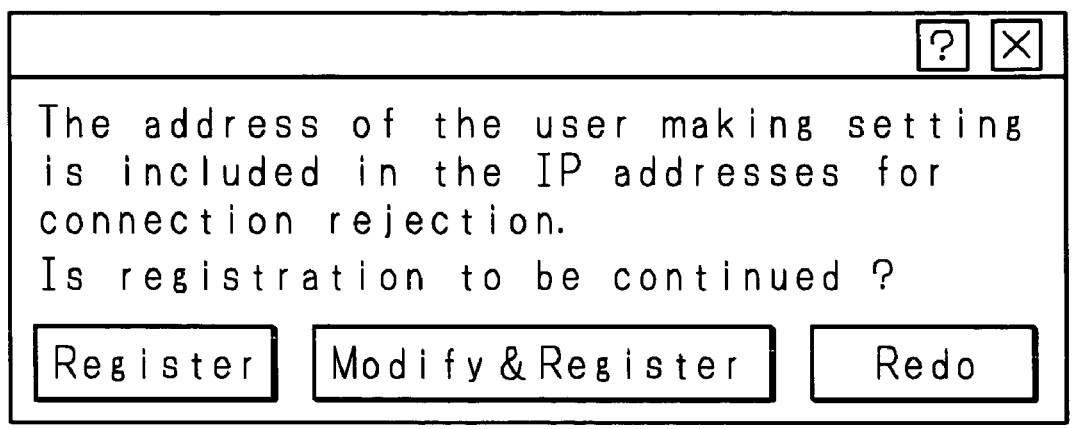
FIG. 8 is a schematic view showing a display screen to be displayed on the display apparatus of the terminal device (PC) for the administrator.
Figure 12:
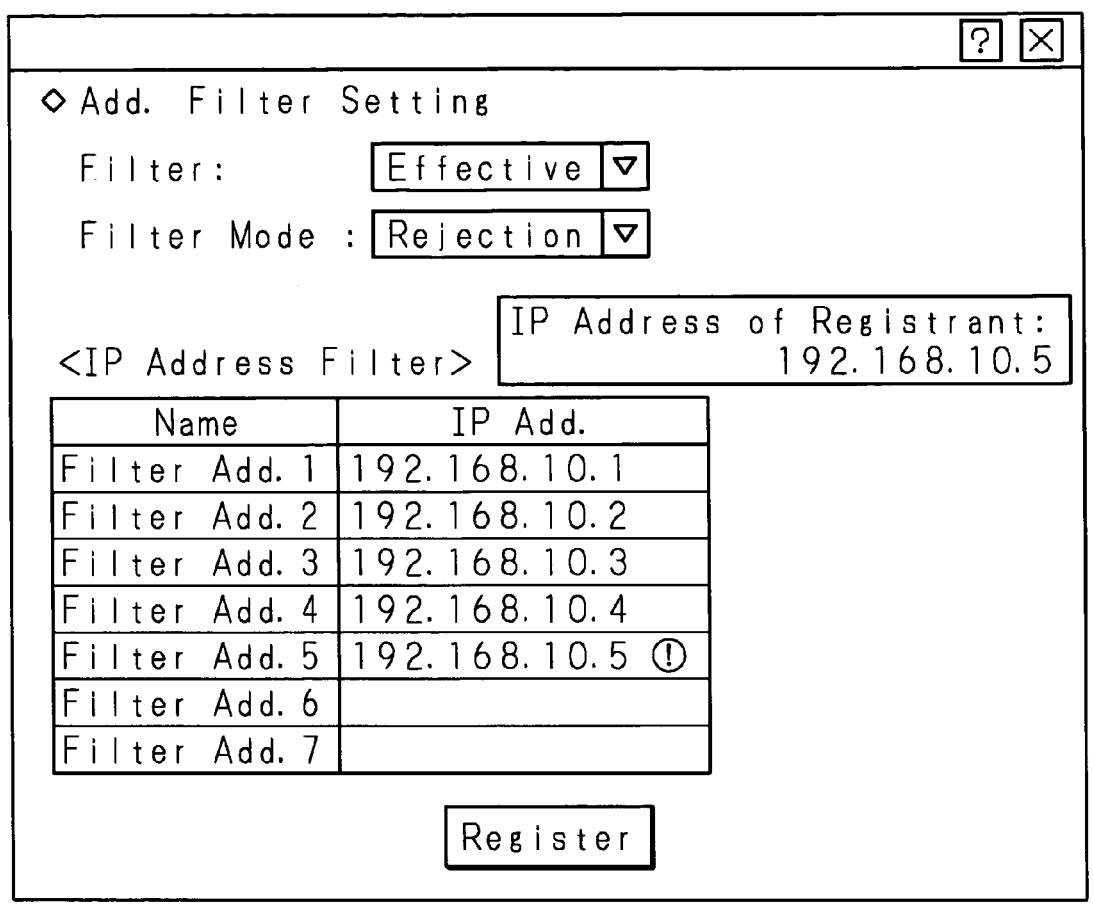
FIG. 12 is a schematic view showing a display screen to be displayed on the display apparatus of the terminal device (PC) for the administrator.

Here, a screen shown in FIG. 12 may be displayed instead of the screen shown in FIG. 8. In the example shown in FIG. 12, symbol "!" is added to the IP address "192.168.10.5" of the PC 3 for the administrator which is inputted in the column of "IP Address Filter" of the same screen as that shown in FIG. 7 ("Filter" is set to "Effective" and "Rejection" is set as "Filter Mode") in order to call attention.

In the case of FIG. 8, when "Register" is selected on the PC 3 for the administrator and the fact is instructed (transmitted) to the MFP 1 (YES in step S32), the control unit 11 registers on the address restriction managing unit 122 the IP addresses which have been temporarily stored in the internal memory 19 in the step S19 without changing the IP addresses (step S21), transmits a filter setting completion screen which is not illustrated in the figure to the PC 3 for the administrator and makes the PC 3 for the administrator display the screen (step S22). Such selection and instruction on the PC 3 for the administrator is performed when the PC which has been used for the administrator is changed to another PC, for example.

On the other hand, when "Modify & Register" is selected on the PC 3 for the administrator in step S32 and the fact is instructed to the MFP 1 ("AUTOMATIC MODIFICATION" in step S32), the control unit 11 shifts the process to a subroutine of modification process as shown in the flow chart in FIG. 6 (step S33). In particular, the control unit 11 first judges whether connection authorization setting is presently selected or not (connection rejection setting is selected when the connection authorization setting is not selected presently) (step S51). In this case, since connection authorization setting is selected (YES in step S51), the control unit 11 makes the internal memory 19 store the IP address which has been detected by the access address detecting unit 18 of the PC 3 for the administrator under accessing in addition to the stored IP addresses (step S52) and returns the procedure.

Figure 9:
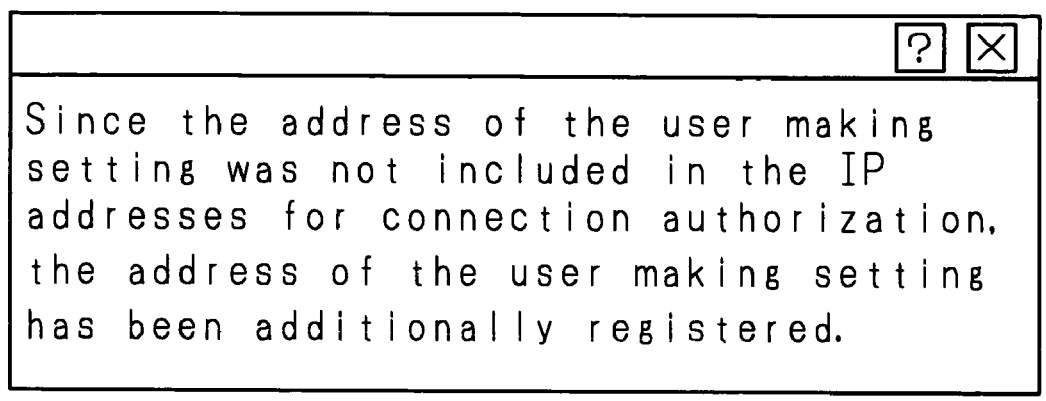
FIG. 9 is a schematic view showing a display screen to be displayed on the display apparatus of the terminal device (PC) for the administrator.

Accordingly, the IP address of the PC 3 for the administrator is stored in addition to the IP addresses which have been temporarily stored in the internal memory 19 in the step S19, and the registering unit 17 of the control unit 11 registers these IP addresses on the address restriction managing unit 122 (step S21), transmits a filter setting completion screen to the PC 3 for the administrator and makes the PC 3 for the administrator display the screen (step S22). In this case, displayed is message "Since address of the user making setting was not included in the IP addresses for connection authorization, the address of the user making setting has been additionally registered." as shown in FIG. 9.

Consequently, when the IP address of its own is not included in the IP addresses to be registered from the PC 3 for the administrator in a state where connection authorization setting is selected, an alarm message is displayed in step S31, and furthermore, when "Modify & Register" is selected, the IP address of the PC 3 for the administrator is also automatically registered on the address restriction managing unit 122 as an IP address of an object of connection authorization.

It should be noted that, when "Redo" is selected on the screen shown in FIG. 8 on the PC 3 for the administrator and the fact is instructed to the MFP 1 (NO in step S32), the control unit 11 returns the process to the step S16 and performs the processes after the above step S16 again.

Next, the following description will explain a case where "connection rejection setting" is selected on the PC 3 for the administrator ("CONNECTION REJECTION SETTING" in step S17). In this case, the IP address of the PC, connection from which to the MFP 1 is to be rejected, is inputted in the PC 3 for the administrator, and when the "Register" button at the lower part of the screen is clicked with mouse, for example, the MFP 1 receives the IP address inputted in the column of "IP Address Filter" through the communication unit 15 (step S41), changes setting of the address restriction managing unit 122 to "CONNECTION REJECTION" and temporarily stores the received IP address in the internal memory 19 (step S42).

The judgment unit 16 of the control unit 11 then judges whether the IP address of the PC 3 for the administrator which has been detected by the access address detecting unit 18 in the step S15 is included in the IP addresses which have been temporarily stored in the internal memory 19 in step S42 or not (step S43). When it is judged that the IP address of the PC 3 for the administrator is not included in the IP addresses stored in the internal memory 19 as a result (NO in step S43), the registering unit 17 of the control unit 11 registers on the address restriction managing unit 122 the IP addresses which have been temporarily stored in the internal memory 19 in the step S42 without changing the IP addresses (step S21), transmits a filter setting completion screen which is not illustrated in the figure to the PC 3 for the administrator and makes the PC 3 for the administrator display the screen (step S22).

On the other hand, in a case of "YES" in the step S43, i.e. when it is judged that the IP address of the PC 3 for the administrator is included in the IP addresses which have been temporarily stored in the internal memory 19, the control unit 11 notifies the PC 3 for the administrator that connection (access) of the PC 3 for the administrator becomes impossible after setting of filtering (step S31). Accordingly, displayed on the PC 3 for the administrator are three kinds of buttons including "Register", "Modify & Register" and "Redo", and message "The address of the user making setting is not included in the IP addresses for connection authorization. Is registration to be continued?" as shown in FIG. 10.

Figure 10:
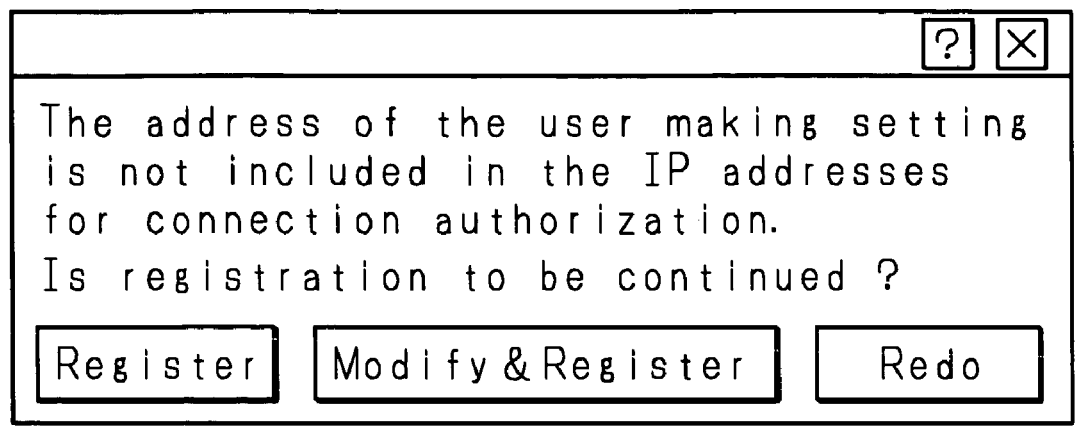
FIG. 10 is a schematic view showing a display screen to be displayed on the display apparatus of the terminal device (PC) for the administrator.
Figure 13:
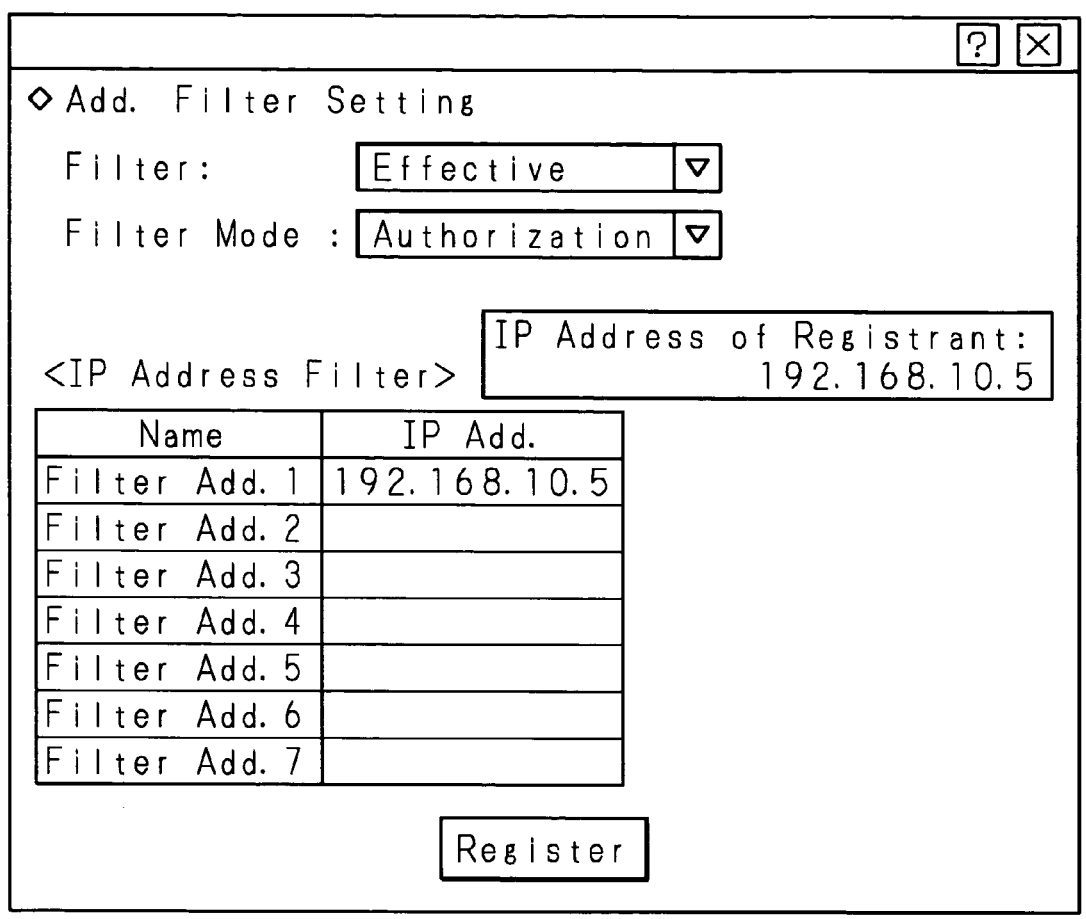
FIG. 13 is a schematic view showing a display screen to be displayed on the display apparatus of the terminal device (PC) for the administrator.

Here, a screen shown in FIG. 13 may be displayed instead of the screen shown in FIG. 10. In the example shown in FIG. 13, the IP address "192.168.10.5" of the PC 3 for the administrator is automatically inputted in the column of "IP Address Filter" of the same screen as that shown in FIG. 7 displayed at the display apparatus of the PC 3 for the administrator ("Filter" is set to "Effective" and "Authorization" is set as "Filter Mode").

In the case of FIG. 10, when "Register" is selected on the PC 3 for the administrator and the fact is instructed to the MFP 1 (YES in step S32), the control unit 11 registers on the address restriction managing unit 122 the IP addresses which have been temporarily stored in the internal memory 19 in the step S19 without changing the IP addresses (step S21), transmits a filter setting completion screen which is not illustrated in the figure to the PC 3 for the administrator and makes the PC 3 for the administrator display the screen (step S22). Such selection and instruction on the PC 3 for the administrator is performed when a PC which has been used for the administrator is changed to another PC.

On the other hand, when "Modify & Register" is selected on the PC 3 for the administrator in step S32 and the fact is instructed to the MFP 1 ("AUTOMATIC MODIFICATION" in step S32), the control unit 11 shifts the process to a subroutine of modification process as shown in the flow chart in FIG. 6. In particular, the control unit 11 first judges whether connection authorization setting is currently selected or not (connection rejection setting is selected when connection authorization setting is not selected currently) (step S51). In this case, since connection rejection setting is selected (NO in step S51), the control unit 11 deletes the IP address of the PC 3 for the administrator from the IP addresses stored in the internal memory 19 (step S53) and returns the procedure.

Figure 11:
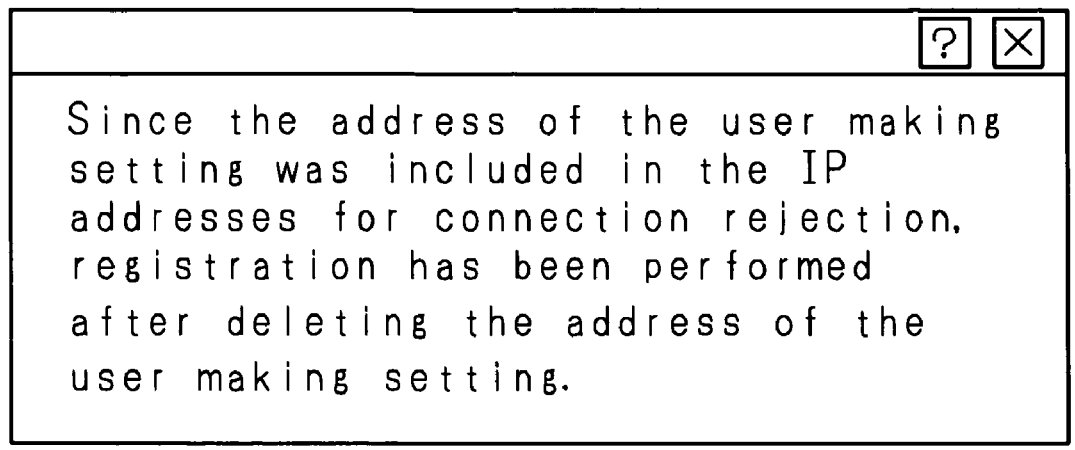
FIG. 11 is a schematic view showing a display screen to be displayed on the display apparatus of the terminal device (PC) for the administrator.

Accordingly, the IP address of the PC 3 for the administrator is deleted from the IP addresses which have been temporarily stored in the internal memory 19 in the step S42, and the control unit 11 registers the rest of the IP addresses on the address restriction managing unit 122 (step S21), transmits a filter setting completion screen to the PC 3 for the administrator and makes the PC 3 for the administrator display the screen (step S22). In this case, displayed is message "Since the address of the user making setting was included in the IP addresses for connection rejection, registration has been performed after deleting the address of the user making setting." as shown in FIG. 11.

Consequently, even if the IP address of its own is inputted in the PC 3 for the administrator in a state where connection rejection setting is selected, when the alarm message is displayed in step S31 and "Modify & Register" is selected, registration of the IP address of the PC 3 for the administrator on the address restriction managing unit 122 as the IP address of an object of connection rejection is automatically avoided.

It should be noted that, when "Redo" is selected on the screen in FIG. 10 in the PC 3 for the administrator and the fact is instructed to the MFP 1 (NO in step S32), the controller 11 returns the process to the step S16 and performs processes after the above step S16 again.

Though the above embodiment has shown the structure in which only one PC 3 for the administrator is connected to the network, a plurality of terminal devices (PCs) for the administrator may be located against one network device (MFP 1). Moreover, all the terminal devices (PCs) connected to the network may be PCs for the administrator.

Furthermore, though the above embodiment has shown an example in which the IP address received by the MFP 1 is temporarily stored in the internal memory 19, the IP address may be registered directly on the address restriction managing unit 122 and the IP address of the PC 3 for the administrator may be deleted or additionally registered according to need.

With the first aspect of the network device according to the present invention, as described above, in a case where registration of a terminal device an access from which is to be rejected is instructed, it is checked whether identification information of the terminal device which has set the registration, in particular the terminal device for the administrator, exists or not, and when the identification information of the terminal device for the administrator exists, the identification information of the terminal device for the administrator is automatically deleted and only the rest of identification information is registered, so that it is possible to prevent getting into a situation that an access from the terminal device for the administrator becomes impossible after completion of setting.

With the second aspect of the network device according to the present invention, in a case where registration of a terminal device an access from which is to be authorized is instructed, it is checked whether identification information of the terminal device which has set the registration, in particular the terminal device for the administrator, exists or not, and when the identification information of the terminal device for the administrator does not exist, the identification information of the terminal device for the administrator is automatically registered additionally, so that it is possible to prevent getting into a situation that an access from the terminal device for the administrator becomes impossible after completion of setting.

With the third aspect of the network device according to the present invention, in a case where registration of a terminal device an access from which is to be rejected is instructed, it is checked whether identification information of the terminal device which has set the registration, in particular the terminal device for the administrator, exists or not, and when the identification information of the terminal device for the administrator exists, the fact is notified to the terminal device for the administrator, so that it is possible to prevent getting into a situation that an access from the terminal device for the administrator becomes impossible after completion of setting if the user of the terminal device for the administrator performs resetting at the time.

With the fourth aspect of the network device according to the present invention, in a case where registration of a terminal device an access from which is to be authorized is instructed, it is checked whether identification information of the terminal device which has set the registration, in particular the terminal device for the administrator, exists or not, and when the identification information of the terminal device for the administrator does not exist, the fact is notified to the terminal device for the administrator, so that it is possible to prevent getting into a situation that an access from the terminal device for the administrator becomes impossible after completion of setting if the user of the terminal device for the administrator performs resetting at the time.

With the fifth aspect of the network device according to the present invention, in a case where registration of a terminal device an access from which is to be rejected is instructed, it is checked whether identification information of the terminal device which has set the registration, in particular the terminal device for the administrator, exists or not, and when the identification information of the terminal device for the administrator exists, the identification information of the terminal device is displayed with emphasis on the terminal device for the administrator, so that it is possible to prevent getting into a situation that an access from the terminal device for the administrator becomes impossible after completion of setting if the user of the terminal device for the administrator is reminded and performs resetting at the time.

With the sixth aspect of the network device according to the present invention, in a case where registration of a terminal device an access from which is to be authorized is instructed, it is checked whether identification information of the terminal device which has set the registration, in particular the terminal device for the administrator, exists or not, and when the identification information of the terminal device for the administrator does not exist, the identification information of the terminal device is automatically set on the terminal device for the administrator, so that it is possible to prevent getting into a situation that an access from the terminal device for the administrator becomes impossible after completion of setting even if the user of the terminal device for the administrator is not reminded at the time.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network device, which is network-connected with a plurality of terminal devices and has a network filtering function for rejecting an access from a preliminarily registered terminal device among said plurality of terminal devices, comprising:
an identification information registration unit on which identification information for identifying a terminal device an access from which is to be rejected, among said plurality of terminal devices, is registered;
detecting means for detecting identification information of an access terminal device for an administrator that is accessing the network device;
receiving means for receiving identification information of one or more terminal devices an access from which is to be rejected, wherein said identification information of one or more terminal devices an access from which is to be rejected is transmitted from said access terminal device that is accessing the network device;
judging means for judging whether the detected identification information by said detecting means is included in the received identification information by said receiving means or not; and
registering means for, when said judging means judges that the identification information detected by said detecting means is included in the received identification information, registering the received identification information on said identification information registration unit after excluding the identification information detected by said detecting means from the received identification information.

2. A network device, which is network-connected with a plurality of terminal devices and has a network filtering function for authorizing an access from a preliminarily registered terminal device among said plurality of terminal devices, comprising:
an identification information registration unit on which identification information for identifying a terminal device an access from which is to be authorized, among said plurality of devices, is registered;
detecting means for detecting identification information of an access terminal device for an administrator that is accessing the network device;
receiving means for receiving identification information of one or more terminal devices an access from which is to be authorized, wherein said identification information of one or more terminal devices an access from which is to be authorized is transmitted from said access terminal device that is accessing the network device;
judging means for judging whether the detected identification information by said detecting means is included in the received identification information by said receiving means or not; and
registering means for, when said judging means judges that the identification information detected by said detecting means is not included in the received identification information, registering the received identification information on said identification information registration unit after adding the identification information detected by said detecting means to the received identification information.

3. A network device, which is network-connected with a plurality of terminal devices and has a network filtering function for rejecting an access from a preliminarily registered terminal device among said plurality of terminal devices, comprising:
an identification information registration unit on which identification information for identifying a terminal device an access from which is to be rejected, among said plurality of terminal devices, is registered;
detecting means for detecting identification information of an access terminal device for an administrator that is accessing the network device;
receiving means for receiving identification information of one or more terminal devices an access from which is to be rejected, wherein said identification information of one or more terminal devices an access from which is to be rejected is transmitted from said access terminal device that is accessing the network device;
judging means for judging whether the detected identification information by said detecting means is included in the received identification information by said receiving means or not; and
means for, when said judging means judges that the identification information detected by said detecting means is included in the received identification information, notifying the terminal device that is accessing the network device of the same.

4. A network device, which is network-connected with a plurality of terminal devices and has a network filtering function for authorizing an access from a preliminarily registered terminal device among said plurality of terminal devices, comprising:
an identification information registration unit on which identification information for identifying a terminal device an access from which is to be authorized, among said plurality of terminal devices, is registered;
detecting means for detecting identification information of an access terminal device for an administrator that is accessing the network device;
receiving means for receiving identification information of one or more terminal devices an access from which is to be authorized, wherein said identification information of one or more terminal devices an access from which is to be authorized is transmitted from said access terminal device that is accessing the network device;
judging means for judging whether the detected identification information by said detecting means is included in the received identification information by said receiving means or not; and
means for, when said judging means judges that the identification information detected by said detecting means is not included in the received identification information, notifying the terminal device that is accessing the network device of the same.

5. A network device, which is network-connected with a plurality of terminal devices and has a network filtering function for rejecting an access from a preliminarily registered terminal device among said plurality of terminal devices, comprising:
an identification information registration unit on which identification information for identifying a terminal device an access from which is to be rejected, among said plurality of terminal devices, is registered;
detecting means for detecting identification information of an access terminal device for an administrator that is accessing the network device;
receiving means for receiving identification information of one or more terminal devices an access from which is to be rejected, wherein said identification information of one or more terminal devices an access from which is to be rejected is transmitted from said access terminal device that is accessing the network device;

judging means for judging whether the detected identification information by said detecting means is included in the received identification information by said receiving means or not; and means for, when said judging means judges that the identification information detected by said detecting means is included in the received identification information, making a display state of the identification information detected by said detecting means on a display screen of the terminal device that is accessing the network device different from other identification information.

6. A network device, which is network-connected with a plurality of terminal devices and has a network filtering function for authorizing an access from a preliminarily registered terminal device among said plurality of terminal devices, comprising:

an identification information registration unit on which identification information for identifying a terminal device an access from which is to be authorized, among said plurality of terminal devices, is registered;

detecting means for detecting identification information of an access terminal device for an administrator that is accessing the network device;

receiving means for receiving identification information of one or more terminal devices an access from which is to be authorized, wherein said identification information of one or more terminal devices an access from which is to be authorized is transmitted from said access terminal device that is accessing the network device;

judging means for judging whether the detected identification information by said detecting means is included in the received identification information by said receiving means or not; and means for, when said judging means judges that the identification information detected by said detecting means is not included in the received identification information, setting the identification information detected by said detecting means on a display screen of the terminal device that is accessing the network device as identification information to be registered.

7. A network device, which is network-connected with a plurality of terminal devices and has a network filtering function for rejecting an access from a preliminarily registered terminal device among said plurality of terminal devices, comprising:

an identification information registration unit on which identification information for identifying a terminal device an access from which is to be rejected, among said plurality of terminal devices, is registered; and a controller, coupled to said identification information registration unit, and capable of performing the following operations of:

detecting identification information of an access terminal device for an administrator that is accessing the network device;

receiving means for receiving identification information of one or more terminal devices an access from which is to be rejected, wherein said identification information of one or more terminal devices an access from which is to be rejected is transmitted from said access terminal device that is accessing the network device;

judging whether the detected identification information is included in the received identification information by said receiving means or not; and registering the received identification information on said identification information registration unit after excluding the detected identification information from the received identification information, when it is judged that the detected identification information is included in the received identification information.

8. A network device, which is network-connected with a plurality of terminal devices and has a network filtering function for authorizing an access from a preliminarily registered terminal device among said plurality of terminal devices, comprising:

an identification information registration unit on which identification information for identifying a terminal device an access from which is to be authorized, among said plurality of terminal devices, is registered; and a controller, coupled to said identification information registration unit, and capable of performing the following operations of:

detecting identification information of an access terminal device for an administrator that is accessing the network device;

receiving means for receiving identification information of one or more terminal devices an access from which is to be authorized, wherein said identification information of one or more terminal devices an access from which is to be authorized is transmitted from said access terminal device that is accessing the network device;

judging whether the detected identification information is included in the received identification information by said receiving means or not; and registering the received identification information on said identification information registration unit after adding the detected identification information to the received identification information, when it is judged that the detected identification information is not included in the received identification information.

9. A network device, which is network-connected with a plurality of terminal devices and has a network filtering function for rejecting an access from a preliminarily registered terminal device among said plurality of terminal devices, comprising:

an identification information registration unit on which identification information for identifying a terminal device an access from which is to be rejected, among said plurality of terminal devices, is registered; and a controller, coupled to said identification information registration unit, and capable of performing the following operations of:

detecting identification information of an access terminal device for an administrator that is accessing the network device;

receiving means for receiving identification information of one or more terminal devices an access from which is to be rejected, wherein said identification information of one or more terminal devices an access from which is to be rejected is transmitted from said access terminal device that is accessing the network device;

judging whether the detected identification information is included in the received identification information by said receiving means or not; and notifying the terminal device that is accessing the network device that the detected identification information is included in the received identification information, when it is judged so.

10. A network device, which is network-connected with a plurality of terminal devices and has a network filtering function for authorizing an access from a preliminarily registered terminal device among said plurality of terminal devices, comprising:

an identification information registration unit on which identification information for identifying a terminal device from which is to be authorized, among said plurality of terminal devices, is registered; and a controller, coupled to said identification information registration unit, and capable of performing the following operations of:

detecting identification information of an access terminal device for an administrator that is accessing the network device;

receiving means for receiving identification information of one or more terminal devices an access from which is to be authorized, wherein said identification information of one or more terminal devices an access from which is to be authorized is transmitted from said access terminal device that is accessing the network device;

judging whether the detected identification information is included in the received identification information by said receiving means or not; and notifying the terminal device that is accessing the network device that the detected identification information is not included in the received identification information, when it is judged so.

11. A network device, which is network-connected with a plurality of terminal devices and has a network filtering function for rejecting an access from a preliminarily registered terminal device among said plurality of terminal devices, comprising:

an identification information registration unit on which identification information for identifying a terminal device an access from which is to be rejected, among said plurality of terminal devices, is registered; and a controller, coupled to said identification information registration unit, and capable of performing the following operations of:

detecting identification information of an access terminal device for an administrator that is accessing the network device;

receiving means for receiving identification information of one or more terminal devices an access from which is to be rejected, wherein said identification information of one or more terminal devices an access from which is to be rejected is transmitted from said access terminal device that is accessing the network device;

judging whether the detected identification information is included in the received identification information by said receiving means or not; and making a display state of the detected identification information on a display screen of the terminal device that is accessing the network device different from other identification information, when it is judged that the detected identification information is included in the received identification information.

12. A network device, which is network-connected with a plurality of terminal devices and has a network filtering function for authorizing an access from a preliminarily registered terminal device among said plurality of terminal devices, comprising:

an identification information registration unit on which identification information for identifying a terminal device an access from which is to be authorized, among said plurality of terminal devices, is registered; and a controller, coupled to said identification information registration unit, and capable of performing the following operations of:

detecting identification information of an access terminal device for an administrator that is accessing the network device;

receiving means for receiving identification information of one or more terminal devices an access from which is to be authorized, wherein said identification information of one or more terminal devices an access from which is to be authorized is transmitted from said access terminal device that is accessing the network device;

judging whether the detected identification information is included in the received identification information by said receiving means or not; and setting the detected identification information on a display screen of the terminal device that is accessing the network device as identification information to be registered, when it is judged that the detected identification information is not included in the received identification information.

13. A network device, which is network-connected with a plurality of terminal devices and has a network filtering function for rejecting an access from a preliminarily registered terminal device among said plurality of terminal devices, comprising:

an identification information registration unit on which identification information for identifying a terminal device an access from which is to be rejected, among said plurality of terminal devices, is registered;

detecting unit which detects identification information of an access terminal device for an administrator that is accessing the network device;

a receiving unit which receives information of one or more terminal devices an access from which is to be rejected, wherein said identification information of one or more terminal devices an access from which is to be rejected is transmitted from said access terminal device that is accessing the network device; and a judging unit which judges whether the detected identification information by the detecting unit is included in the received identification information by the receiving unit or not, wherein the identification information registration unit, when said judging unit judges that the detected identification information by the detecting unit is included in the received identification information by the receiving unit, registers the received identification information after excluding the detected identification information by the detecting unit from the received identification information by the receiving unit.

14. A network device, which is network-connected with a plurality of terminal devices and has a network filtering function for authorizing an access from a preliminarily registered terminal device among said plurality of terminal devices, comprising:

an identification information registration unit on which identification information for identifying a terminal device an access from which is to be authorized, among said plurality of terminal devices, is registered;

detecting unit which detects identification information of an access terminal device for an administrator that is accessing the network device;

a receiving unit which receives identification information of one or more terminal devices an access from which is to be authorized, wherein said identification information of one or more terminal devices an access from which is to be authorized is transmitted from said access terminal device that is accessing the network device; and a judging unit which judges whether the detected identification information by the detecting unit is included in the received identification information by the receiving unit or not, wherein the identification information registration unit, when said judging unit judges that the detected identification information by the detecting unit is not included in the received identification information by the receiving unit, registers the received identification information after adding the detected identification information by the detecting unit to the received identification information by the receiving unit.

* * * * *